Oct. 26, 1948.  S. KELLOGG, II  2,452,473
GYROSCOPIC FLIGHT INSTRUMENT
Filed Oct. 17, 1945  2 Sheets-Sheet 1
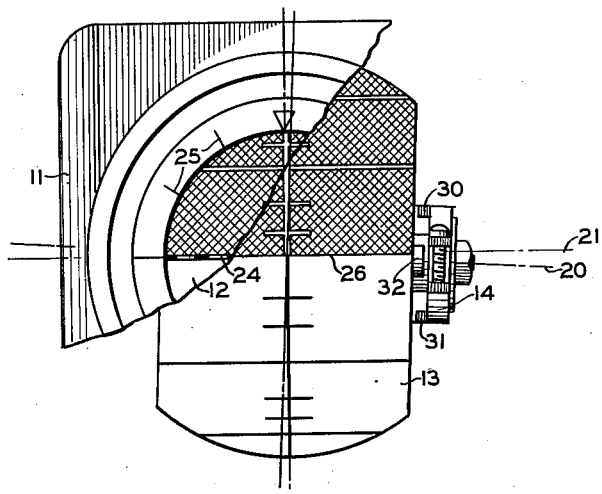
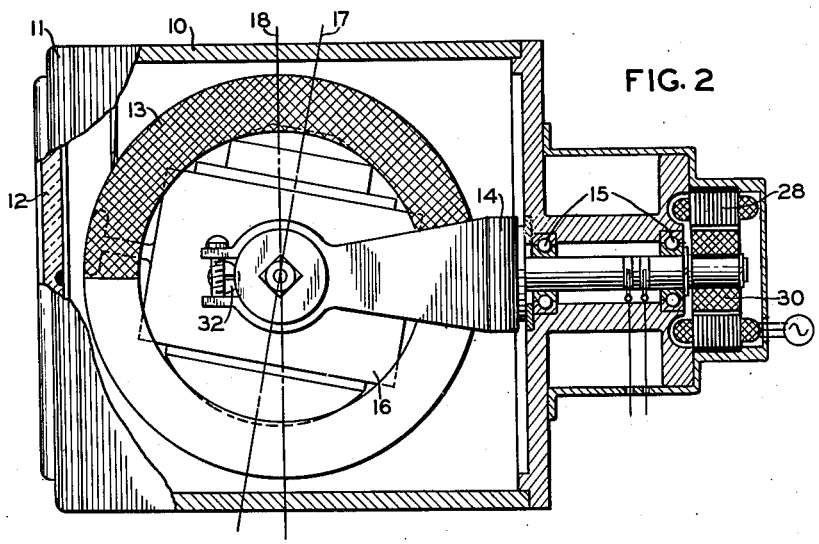
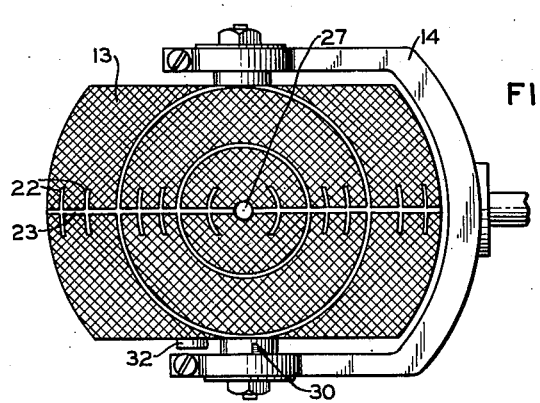
INVENTOR
SPENCER KELLOGG II
BY
Herbert B. Thompson
his ATTORNEY Oct. 26, 1948.  S. KELLOGG, II  2,452,473
GYROSCOPIC FLIGHT INSTRUMENT
Filed Oct. 17, 1945  2 Sheets-Sheet 2

INVENTOR
SPENCER KELLOGG II
BY
*Herbert P. Thompson*
his ATTORNEY

Patented Oct. 26, 1948

2,452,473

UNITED STATES PATENT OFFICE 2,452,473

GYROSCOPIC FLIGHT INSTRUMENT

Spencer Kellogg, 2nd, Glen Head, N. Y., assignor to The Sperry Corporation, a corporation of Delaware Application October 17, 1945, Serial No. 622,771

10 Claims. (Cl. 74—5)

This invention relates particularly to universally maneuverable gyroscopic flight instruments of the character known in the art as universal gyro verticals or attitude gyros. Such instruments may provide both or either an autopilot control or a visual indication of the position of the craft about its longitudinal axis and lateral axis with respect to the earth. This type of gyroscopic artificial horizon has come into use for military airplanes likely to indulge in acrobatics, since under such conditions the standard type of artificial horizon strikes stops and is upset or tumbles, so that it is temporarily rendered inoperative, and requires resetting.

As shown in the drawings, the invention may be incorporated in an attitude gyroscopic instrument having a visual indication provided by a stabilized sphere that appears to the pilot to move with complete freedom in pitch and roll relative to a fixed index as the craft maneuvers. The improved form of instrument shown may also be corrected for turn error and pendulousness by inclining the axis of the rotor in a manner that forms no part of the present invention.

One of the objects of the present invention is to provide an instrument of this character in which a condition of gimbal lock where the axis of the gimbal ring and spin axis of the rotor become coincident is prevented.

Gimbal lock as defined, has proved undesirable in several types of attitude gyros, including attiture gyros used as base lines for aircraft automatic pilots and also the type of attitude gyro having a slight forward inclination as taught in the patent to Braddon, 2,409,659, dated October 22, 1946, for Gyro-verticals. One of the principal objections to gimbal lock is that this condition frequently causes temporary reversal in relation between the rotor casing and the observer and between the gimbal ring and rotor casing, but such reversal does not always take place, the result occasionally being that when the airplane has again resumed level flight after an acrobatic maneuver, the casing of the gyro rotor remains reversed in azimuth with the gimbal upside down, so that the pilot is then looking at what was the backside of the case. These troubles may be overcome optically my making the case the same on both the front and back, the gimbal ring not being visible in the this type of gyro, but this would leave the controls reversed if used for a base line on automatic pilots. It would also, where a forward inclination is employed, throw out the correct relationship between certain types of erection mechanism and the gyro case and change the horizon reading at the face of the instrument.

By preventing the gyroscope from going through gimbal lock condition, I have largely overcome all of the above difficulties. For this purpose, I provide the attitude gyro with limit stops preferably about the inner or minor axis only, which axis usually lies athwartship on the craft, and I position such stops in an entirely different position from stops heretofore employed in the prior art, in which limit stops had been employed for quite a different purpose and with entirely different results. In the prior art the limit stops came into operation at comparatively moderate angles of inclination, such as, 45 to 65 degrees with the effect of rendering the gyro inoperative beyond this limit. Such stops were also employed about both major and minor gimbal axes. When struck, these stops cause violent precession of the gyroscope and upset the same and thus render the gyro useless until reset. I have discovered, however, that by employing very high angle stops about only the minor axis, which angles are within fairly critical angular limits, I can avoid upsetting the gyro, prevent gimbal lock, and cause the gyro to invariably maintain the same face toward the pilot and the same side of the gimbal ring uppermost upon resumption of normal flight after acrobatics. By this means, I am able to retain the forwardly inclined type of gyro-vertical, render unnecessary a provision of markings on the back, as well as the front of the rotor case, prevent ambiguity in the output of the pick-off therefrom if the gyro is employed as a stable reference for an automatic pilot, and render resetting mechanisms unnecessary.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects, features and structural details of the invention will be apparent from the following description when read in relation to the accompanying drawing, wherein:

Fig. 1 is a front elevation detail view of the rotor frame and a portion of the front casing of a gyro vertical embodying the present inventive concepts;

Fig. 2 is a side elevation of the gyro vertical illustrated in Fig. 1 with the casing shown in section;

Fig. 3 is a detail plan view of the gimbal ring and rotor frame of the improved instrument;

Figure 4:
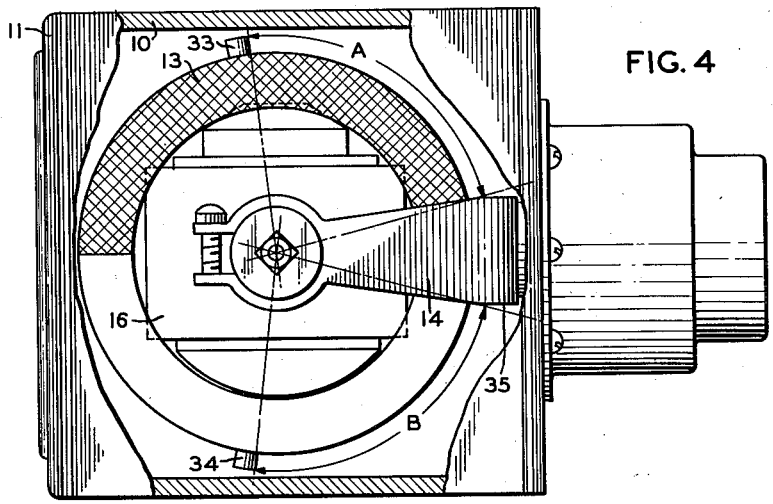
Fig. 4 is a view similar to Fig. 2 showing a modification of the invention.

With reference to the drawing, a gyro vertical embodying the present inventive concepts is shown to include a casing 10 having a front wall 11 with a window 12 therein. To determine position in roll and pitch of the craft on which the instrument is mounted, the pilot observes a stabilized sphere 13 through the window 12. As shown, the improved instrument includes a U-shaped gimbal ring 14 that is pivotally mounted in the casing 10 by means of bearing members 15, the same being mounted with full freedom on an axis that is substantially parallel to or coincident with the longitudinal or fore and aft axis of the craft. The axis of the ring is substantially horizontal. A conventional rotor frame or case 16 is pivotally mounted on the ring 14 to move about a second substantially horizontal axis.

As particularly shown in Figs. 1 and 2, the type of gyro vertical in which the present invention is embodied is such as to provide automatic correction for turn error and for pendulousness. To compensate for turn error the spin axis 17 of the rotor (not shown) of the instrument is inclined to the truly vertical designed by line 18, as particularly indicated in Fig. 2. Also as indicated in Fig. 1, the axis 20 of the rotor frame which is substantially horizontal is slightly inclined to the horizontal designated by line 21. This inclination is for the purpose of correcting the instrument for pendulousness. As the present invention is not concerned with the provisions made for these corrections in the improved instrument, reference is made in this connection to the copending application of Frederick D. Braddon and Walter Wrigley, Serial No. 566,568, filed December 4, 1944, for a more detail description of the matter.

The visual indication provided by the improved flight instrument is obtained from the spherical segment 13 which encircles and is fixedly mounted on the rotor bearing frame 16, the pilot viewing a portion of the surface of the spherical segment through the circular window 12. The surface of the spherical segment is marked with pitch scale 22 and a meridian line 23 that are read by the pilot in connection with a pitch index represented by a line 24, Fig. 1, that is alternately dotted light and dark in color and a roll scale 25 provided by indices situated about the periphery of the circular window. In the construction shown, the upper half of the spherical segment is dark in color and the lower half light in color, the same providing an equatorial line therebetween. When the craft is flying level and straight, the equatorial line of the sphere indicated at 26 is directly behind the pitch index 24. The pitch scale 22 is made up of latitude circles situated 30 and 60 degrees above and below the equatorial line with a number of short horizontal lines between the latitude circles. The 90 degree markings, one of which is shown as indicated at 27, Fig. 3, appear as solid circles that contrast in color with the color of their respective hemispheres. No invention is herein claimed for the type of indication obtained from the gyro vertical.

Further, the improved instrument may be of the type that includes an autopilot control in the form of a pick-off, one of whose parts is operatively connected to ring 14. Such a pick-off may provide a roll signal that is utilized to operate the ailerons of the craft in a manner well known in the art. The pick-off shown in the drawing in this connection is a "Selsyn" device whose stator 28 is fixedly mounted in a suitable manner on the casing 10 of the instrument. The rotor 30 of the "Selsyn" device as shown is fixedly mounted on an extension of the trunnion of the U-shaped gimbal ring 14, the same being positioned by the rotor frame 16. The pick-off of an autopilot control of this nature is normally conditioned to provide a null output when the relative positions of the rotor frame and craft are such that the craft is not tilted from the horizontal about its fore and aft axis.

In accordance with the teaching of the present invention, a gimbal lock condition is prevented in the instrument by limiting the movement between the frame and ring to a range of between ±75 and ±89 degrees from the normal positions thereof where the axis of ring 14 is substantially horizontal and the craft in which the instrument is employed is flying level about its pitch axis. This is accomplished by the use of a pair of stops and a limit piece, one of which is mounted on the frame and the other of which is mounted on the gimbal ring. In the form of the invention shown in Figs. 1 to 3 inclusive, a pair of stops indicated at 30 and 31 are incorporated in the structure of the ring 14. The limit piece is indicated at 32, the same extending in this instance from the right hand side of the rotor frame or case 16 as viewed in Fig. 1. By positioning the stops approximately within the aforesaid critical limits, I am able not only to prevent gimbal lock from being passed through without upsetting or seriously disturbing the gyroscope, but the angle at which the stops strike is so near the vertical that the temporary displacement of the gyro from the vertical when the plane goes through a vertical dive or climb is quite small and is rapidly corrected. At the same time, the force exerted by the stops during this time is sufficient to invariably cause the gimbal to reverse itself, bringing the correct side of the gyro case into view, and preventing the controls from becoming crossed as is more clearly evident from the description of operation hereinafter contained with reference to Fig. 5.

In the alternative form of the invention, shown in Fig. 4, a pair of stops are provided on the rotor case or frame as indicated at 33 and 34. The limit piece 35 in this instance is formed by the upper and lower sides of the base of the gimbal ring 14. Angle A shows the degree of motion permitted between the ring and frame or case of the instrument as the craft moves upwardly about its pitch axis. Angle B indicates the degree of motion permitted between the noted parts as the craft moves downwardly about its pitch axis. In both forms of the invention, the permitted movement between the frame and ring is such that one of the stops and the limit piece move into engagement to prevent a condition of gimbal lock from occurring in the instrument when the craft moves so that the axis of the ring passes through a vertical condition.

The invention is also useful as a means for preventing reversal in the relation between the rotor frame and ring and as a means for preventing ambiguity in the position of the rotor 30 of the pick-off positioned by the frame 16. No means for erecting the rotor case of the instrument is shown in the present instance as the invention is not concerned with the same. However, heretofore in instruments of the character of gyro horizons a caging means was employed to disable the erecting means and maintain the correct relation between the frame and ring when the craft departed widely from straight line flight. The purpose of this arrangement was to assure that the frame maintain its correct relation to the ring. If due to gimbal lock in the attitude type instrument, frame 16 became tilted rearwardly instead of forwardly as shown in Fig. 2, the indicating face of the sphere 13 would present an indication of attitude of the craft about its pitch axis that was in error, and many types of erection devices would function incorrectly. Similarly during gimbal lock the position of ring 14 relative to the case may assume a position that is inverted. This would provide an incorrect signal from the autopilot pick-off of an instrument of the character shown in Fig. 2. By obviating gimbal lock the present invention overcomes the possibility of the occurrence of the noted errors in the improved flight instrument.

Figure 5:
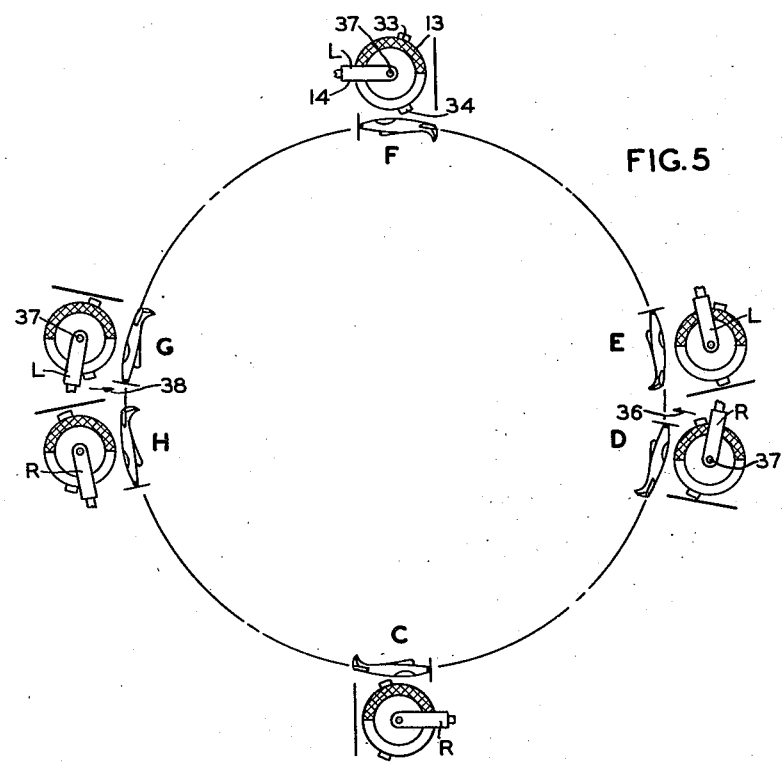
Fig. 5 is a schematic view illustrating the relation between the gyro frame and gimbal ring of the flight instrument as the craft on which the same is mounted maneuvers in an inside loop.

Fig. 5 diagrammatically indicates the operation of the improved flight instrument when the craft on which it is mounted flies through a complete inside loop. Position C in this figure shows the craft flying level with the dark side of the sphere up and light side of the sphere down. The assumed right arm of the ring 14 is also noted, the same being indicated by the letter R. The pilot viewing the indication of the instrument in position C is right side up.

The next position of the instrument is indicated at D. In this view the longitudinal axis of the craft is almost vertical and the ring has engaged the stop 33 on the upper portion of the sphere. This exerts a force indicated by arrow 36 about the axis 37 of the frame or case and results in precession of the ring 14 about its axis so that at position E the opposite or left side of the gimbal ring appears to view as indicated at L. The ring then moves away from the stop 33 as the loop continues.

When the craft is upside down as indicated at position F of this figure, it must be understood that the pilot is also upside down. Consequently to the pilot, equal parts of the light and dark parts of the sphere will be visible with the light part uppermost. This is the reverse of the indication obtained in position C and indicates to the pilot that he is upside down.

Positions G and H of the instrument going down are similar to positions D and E. In this instance, however, the ring engages stop 34, position G, to exert a force indicated by arrow 38 about the axis 37. This precesses the ring until the right side R of the gimbal reappears in position H. As the turn continues the ring moves away from the stop until the parts reassume the positions indicated in position C. It will be noted that the frame remains fixed throughout, the gimbal reversing as the pilot goes upside down. The gimbal further reverses as the pilot comes in a rightside up position. It will further be noted that to maintain the parts in their correct relation it is necessary to reverse ring 14 when the craft is upside down inasmuch as the sphere is then observed from an upside down viewpoint.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a universally maneuverable gyro vertical for aircraft, a casing, a ring pivotally mounted in said casing with full freedom about a substantially horizontal axis, a rotor frame mounted on the ring to pivot about a second substantially horizontal axis perpendicular to the first axis; and means for preventing reversal in the relation between the rotor frame and ring when the axis of the ring moves through a vertical position during movement of the craft comprising a pair of stops and a limit piece, one of which is mounted on the frame and the other of which is mounted on the ring, said piece engaging the stops to limit the movement between the frame and ring to a range of between ±75 and ±89 degrees from the normal positions thereof.

2. In a universally maneuverable gyro vertical for aircraft, a casing, a gimbal ring pivotally mounted in said casing with full freedom about a substantially horizontal axis parallel to the longitudinal axis of the craft, a rotor case mounted on the ring to pivot about a second substantially horizontal axis parallel to the athwartship axis of the craft; and means for preventing reversal in the relation between the rotor case and ring when the axis of the ring moves through a vertical position during movement of the craft comprising a pair of stops on the case and a limit piece on the ring that engages the stops to limit the movement between the case and ring to a range of not more than ±89 degrees and not less than ±75 degrees from the normal positions thereof.

3. In a universally maneuverable gyro vertical for aircraft, a casing, a gimbal ring pivotally mounted in said casing with full freedom about a substantially horizontal axis parallel to the longitudinal axis of the craft, a rotor case mounted on the ring to pivot about a second substantially horizontal axis parallel to the athwartship axis of the craft; and means for preventing reversal in the relation between the rotor case and ring when the axis of the ring moves through a vertical position during movement of the craft comprising a pair of stops on the ring and a limit piece on the case that engages the stops to limit the movement between the case and ring to a range of not more than ±89 degrees and not less than ±75 degrees from the normal positions thereof.

4. Means for preventing gimbal lock in a universally maneuverable gyro vertical with a ring mounted to pivot with full freedom about a substantially horizontal axis and a rotor frame mounted on the ring to pivot about a second substantially horizontal axis perpendicular to the first axis comprising a pair of oppositely disposed stops and a limit piece cooperating with said stops to limit the movement between the frame and ring to not more than ±89 degrees and not less than ±75 degrees from the normal positions thereof.

5. Means for preventing gimbal lock in a universally maneuverable gyro vertical with a gimbal ring and rotor case comprising a pair of stops on the case and a limit piece on the ring that cooperate to confine the relative movement between the case and ring to a range of between ±75 degrees and ±89 degrees from the normal positions thereof.

6. Means for preventing gimbal lock in a universally maneuverable gyro vertical with a gimbal ring and rotor case comprising stops on the ring and on the case respectively that cooperate to confine the relative movement between the case and ring to a range of between ±75 degrees and ±89 degrees from the normal positions thereof.

7. In an aircraft gyro vertical having a forwardly inclined spin axis, a casing, a ring mounted in said casing to pivot with full freedom about a substantially horizontal axis, a rotor frame mounted on the ring to pivot about a second substantially horizontal axis perpendicular to the first axis; and means for preventing a condition of gimbal lock from occuring in the gyro vertical comprising a pair of stops and a limit piece that engages the stops to confine the movement between the frame and ring to a range of between ±75 degrees and ±89 degrees from the normal positions thereof.

8. In an aircraft gyro vertical having a forwardly and laterally inclined spin axis, a casing, a ring mounted in said casing to pivot with full freedom about a substantially horizontal axis, a rotor frame mounted on the ring to pivot about a second substantially horizontal axis perpendicular to the first axis; and means for preventing a condition of gimbal lock from occurring in the gyro vertical comprising a pair of stops and a limit piece that engages the stops to confine the movement between the frame and ring to not more than ±89 degrees and not less ±75 degrees from the normal positions thereof.

9. In a universally maneuverable gyro vertical for aircraft, a casing, a gimbal ring pivotally mounted with full freedom in said casing, a rotor frame pivotally mounted on said ring with the axis thereof perpendicular to the axis of the ring, a pick-off having a part positioned by said rotor frame; and means for preventing ambiguity in the position of the part of the pick-off positioned by the frame comprising a pair of stops and a limit piece that engages the stops to confine the movement of the frame and ring to not more than ±89 degrees and not less than ±75 degrees from the normal positions thereof.

10. In a universally maneuverable gyro vertical for aircraft, a casing, a gimbal ring mounted in said casing to pivot with full freedom about an axis parallel to the longitudinal axis of the craft, a pick-off having a part operatively connected to said ring, a rotor case mounted on the ring to pivot about an axis substantially parallel to the athwartship axis of the craft; and means for preventing ambiguity in the position of the part of the pick-off operatively connected to the ring comprising a pair of stops and a limit piece that engages the stops to confine the movement of the case and ring to not more than ±89 degrees and not less than ±75 degrees from the normal positions thereof.

SPENCER KELLOGG, 2ND.

REFERENCES CITED

The following references are of record in the file of this patent:

UNITED STATES PATENTS

| Number | Name | Date |
| --- | --- | --- |
| 1,939,825 | Narvesen et al. | Dec. 19, 1933 |
| 2,036,229 | Moss | Apr. 7, 1936 |
| 2,044,151 | Sperry, Jr. et al. | June 16, 1936 |
| 2,176,203 | Carter et al. | Oct. 17, 1939 |
| 2,227,371 | Von Manteuffel | Dec. 31, 1940 |